(12) United States Patent
Takami et al.

(10) Patent No.: US 8,482,262 B2
(45) Date of Patent: Jul. 9, 2013

(54) STORAGE BATTERY SYSTEM AND AUTOMOBILE

(75) Inventors: Norio Takami, Yokohama (JP); Hiroki Inagaki, Kawasaki (JP); Yoshinao Tatebayashi, Yokohama (JP); Yuji Sato, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 5 days.

(21) Appl. No.: 12/765,587

(22) Filed: Apr. 22, 2010

(65) Prior Publication Data

US 2010/0201326 A1 Aug. 12, 2010

Related U.S. Application Data

(63) Continuation of application No. 11/230,635, filed on Sep. 21, 2005, now abandoned.

(30) Foreign Application Priority Data

Sep. 24, 2004 (JP) .................... 2004-278242
Aug. 10, 2005 (JP) .................... 2005-232368

(51) Int. Cl.
*H02J 7/16* (2006.01)
*H01M 10/48* (2006.01)

(52) U.S. Cl.
USPC ........... 320/148; 320/162; 320/163; 320/164; 320/165; 429/90; 429/91

(58) Field of Classification Search
None
See application file for complete search history.

(56) References Cited

U.S. PATENT DOCUMENTS

| | | | |
|---|---|---|---|
| 3,493,837 A | 2/1970 | Layte et al. | |
| 4,572,878 A | 2/1986 | Daugherty | |
| 5,478,675 A * | 12/1995 | Nagaura | 429/224 |
| 5,869,208 A | 2/1999 | Miyasaka | |
| 6,075,346 A * | 6/2000 | Kikuchi et al. | 320/150 |
| 2004/0051501 A1 | 3/2004 | Yu et al. | |
| 2005/0064282 A1 | 3/2005 | Inagaki et al. | |
| 2005/0069777 A1 | 3/2005 | Takami et al. | |
| 2005/0221173 A1 | 10/2005 | Tatebayashi et al. | |
| 2005/0221187 A1 | 10/2005 | Inagaki et al. | |
| 2005/0221188 A1 | 10/2005 | Takami et al. | |
| 2006/0134520 A1 | 6/2006 | Ishii et al. | |
| 2008/0070115 A1 | 3/2008 | Saruwatari et al. | |

FOREIGN PATENT DOCUMENTS

JP 2002-42889 2/2002

OTHER PUBLICATIONS

Ohzuhu, Layered lithium insertion material LiCol/3Nil/3Mnl/3O2 for lithium-ion batteries, Chemistry Letter, The Chemical Society of Japan, C1-010390, 2001, pp. 642-643.

* cited by examiner

*Primary Examiner* — Cynthia Walls
(74) *Attorney, Agent, or Firm* — Oblon, Spivak, McClleland, Maier & Neustadt, L.L.P.

(57) ABSTRACT

A storage battery system includes a battery module including nonaqueous electrolyte secondary batteries. The storage battery system further includes a temperature sensor which measures a temperature of the battery module, a voltmeter which measures a voltage of each of the nonaqueous electrolyte secondary batteries and a charge control unit which controls a maximum end-of-charge voltage $V_1$ (V) of the nonaqueous electrolyte secondary batteries to fall within the range defined in formula (1) given below when the temperature of the battery module is not lower than 45° C. and is not higher than 90° C.:

$$0.85 \times V_0 \leq V_1 \leq 0.96 \times V_0 \quad (1)$$

16 Claims, 7 Drawing Sheets

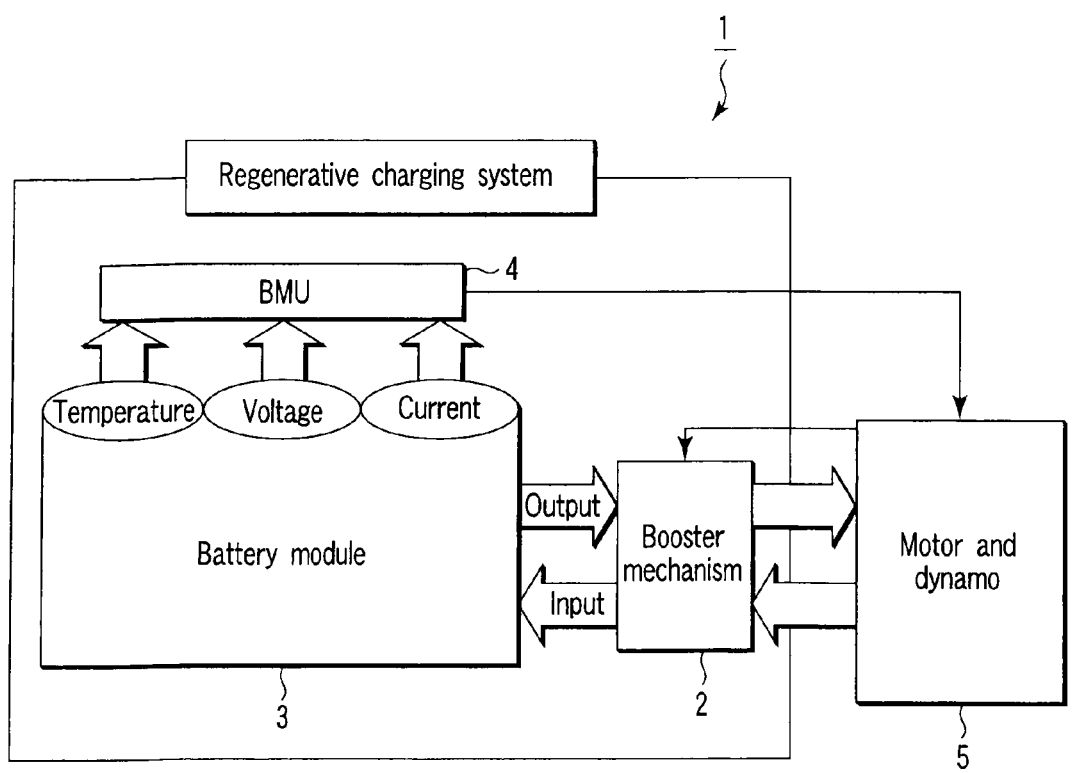
F I G. 1

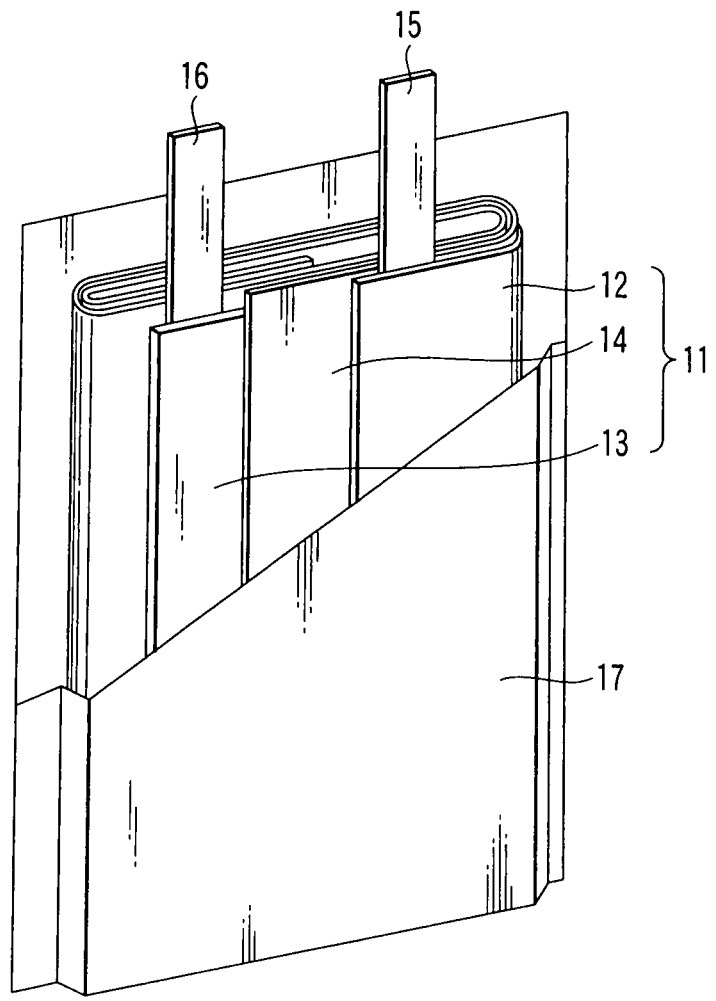
F I G. 2

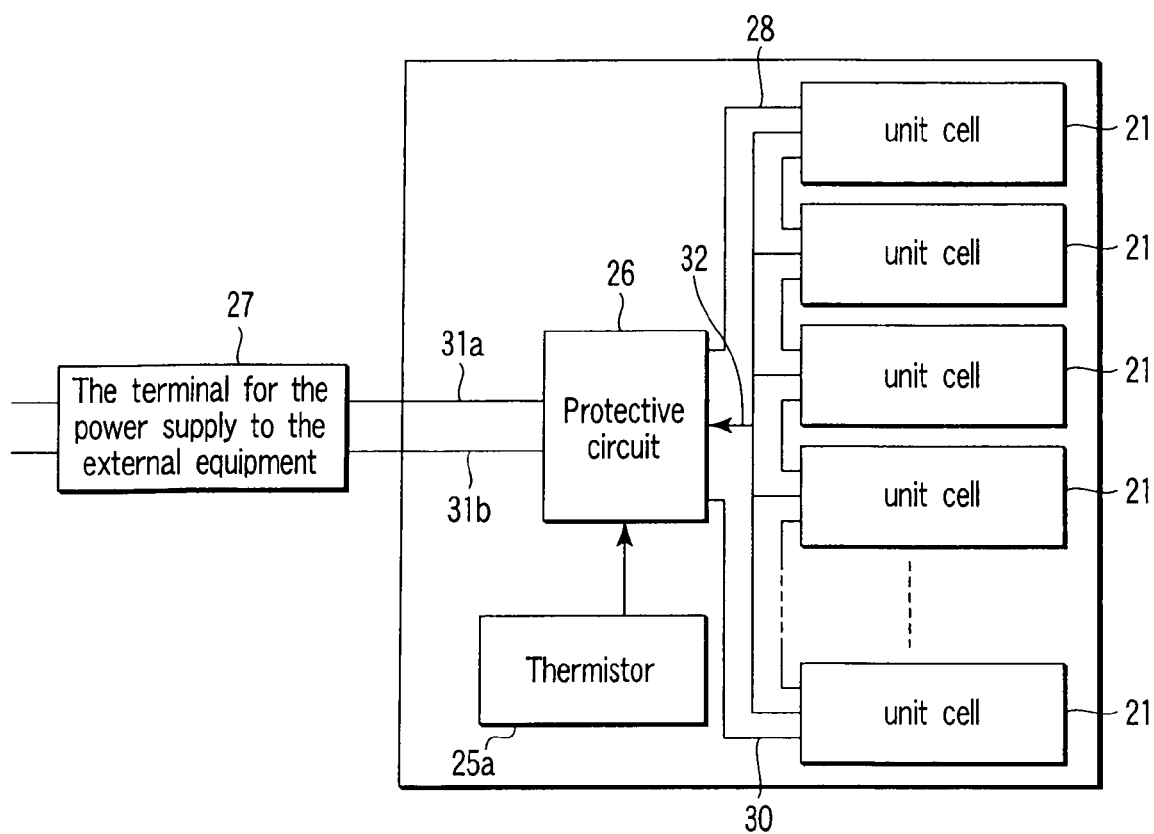
F I G. 6

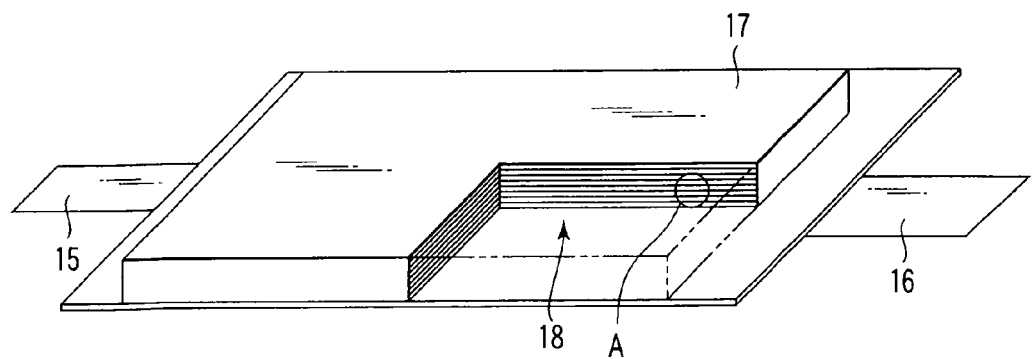
F I G. 7
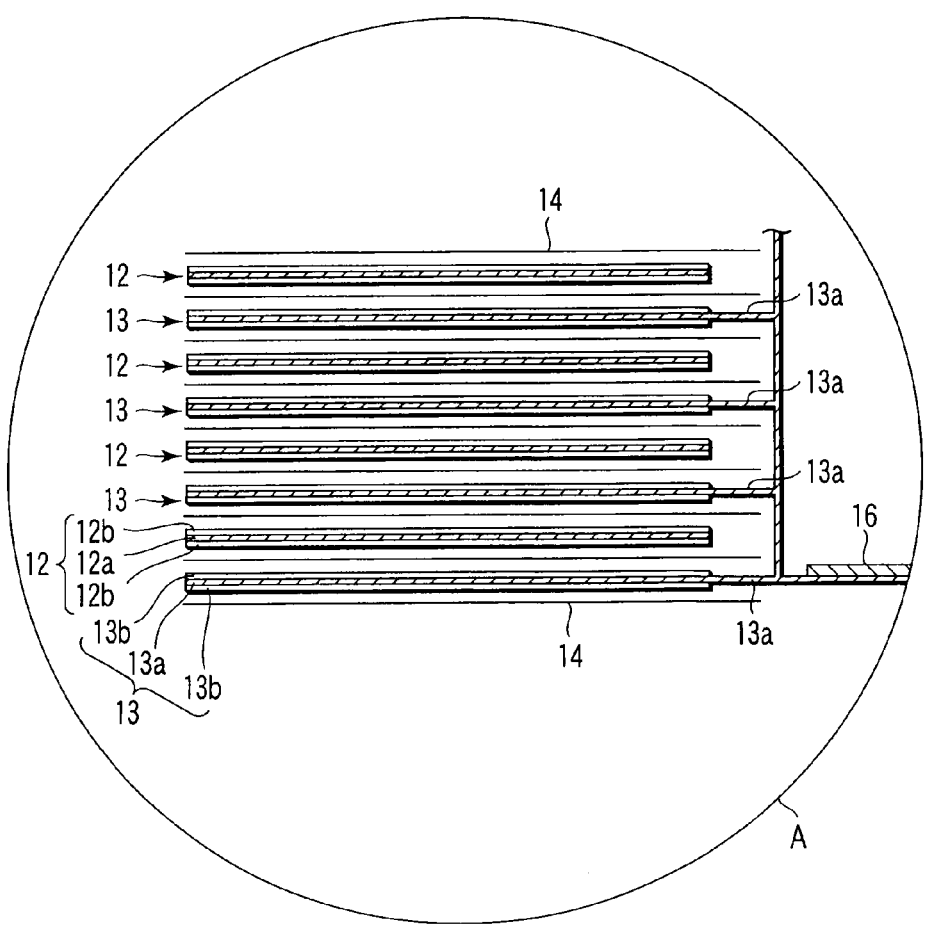
F I G. 8

STORAGE BATTERY SYSTEM AND AUTOMOBILE

CROSS-REFERENCE TO RELATED APPLICATIONS

This application is a continuation of U.S. application Ser. No. 11/230,635, filed on Sep. 21, 2005 now abandoned, and claims the benefit of priority from prior Japanese Patent Applications No. 2004-278242, filed on Sep. 24, 2004; and No. 2005-232368, filed on Aug. 10, 2005, the entire contents of both of which are incorporated herein by reference.

BACKGROUND OF THE INVENTION

1. Field of the Invention

The present invention relates to a storage battery suitable for a regenerative charging system used in, for example, an automobile, a motorcycle, an electric tram, an elevator or a windpower station.

2. Description of the Related Art

In recent years, vigorous research is being conducted on, for example, a hybrid automobile, a motorcycle, an electric tram, an elevator and a windpower plant each having a battery mounted therein in order to utilize effectively the energy, and to utilize effectively the regenerative energy in view of the preservation of the earth's environment. As a matter of fact, a lead-acid battery and a nickel-hydrogen battery have already been put to practical use in, for example, a hybrid automobile having a battery mounted therein.

However, the nickel-hydrogen battery used in, for example, a hybrid automobile, gives rise to the problem that heat is generated rapidly during the high output stage or in the rapid charging (regenerative) stage. In addition, the battery incurs very large thermal deterioration.

Such being the situation, mounting of a lithium ion battery having a thermal deterioration smaller than that of the nickel-hydrogen battery and capable of making the battery module lighter in weight and thinner is being studied. However, a serious problem remains unsolved in the lithium ion battery in that the battery is swollen so as to be deformed under a high temperature environment in, for example, the summer season.

Disclosed in Japanese Patent Disclosure (Kokai) No. 2003-219510 is a charge-discharge control device equipped with a charge-discharge power control means for controlling the charge-discharge power so as to prevent the charge-discharge power from exceeding a predetermined upper limit of the charge-discharge power that is changed in accordance with the temperature in the case where the temperature of the secondary battery exceeds a prescribed temperature.

BRIEF SUMMARY OF THE INVENTION

An object of the present invention is to provide a storage battery system and an automobile, which permit suppressing the swelling of the battery in the rapid charging stage under a high temperature environment as in the regenerative charging under a high temperature environment.

According to a first aspect of the present invention, there is provided a storage battery system, comprising:

a battery module including nonaqueous electrolyte secondary batteries, each of the nonaqueous electrolyte secondary batteries comprising a negative electrode, a positive electrode and a nonaqueous electrolyte, the negative electrode including a negative electrode layer and a current collector having the negative electrode layer mounted thereon, and the negative electrode layer contains lithium-titanium composite oxide particles;

a temperature sensor which measures a temperature of the battery module;

a voltmeter which measures a voltage of each of the nonaqueous electrolyte secondary batteries; and a charge control unit which controls a maximum end-of-charge voltage $V_1$ (V) of the nonaqueous electrolyte secondary batteries to fall within the range defined in formula (1) given below when the temperature of the battery module is not lower than 45° C. and is not higher than 90° C.:

$$0.85 \times V_0 \leq V_1 \leq 0.96 \times V_0 \tag{1}$$

where $V_0$ denotes a maximum end-of-charge voltage (V) of the nonaqueous electrolyte secondary batteries when the battery module is charged fully at 25° C.

According to a second aspect of the present invention, there is provided a storage battery system, comprising:

a battery module including nonaqueous electrolyte secondary batteries, each of the nonaqueous electrolyte secondary batteries comprising a negative electrode, a positive electrode and a nonaqueous electrolyte, the negative electrode including a negative electrode layer and a current collector having the negative electrode layer mounted thereon, and the negative electrode layer contains lithium-titanium composite oxide particles;

a dynamo which forms a regenerative power for charging the battery module;

a temperature sensor which measures a temperature of the battery module;

a voltmeter which measures a voltage of each of the nonaqueous electrolyte secondary batteries; and a charge control unit which controls a maximum end-of-charge voltage $V_1$ (V) of the nonaqueous electrolyte secondary batteries to fall within the range defined in formula (1) given below when the temperature of the battery module is not lower than 45° C. and is not higher than 90° C.:

$$0.85 \times V_0 \leq V_1 \leq 0.96 \times V_0 \tag{1}$$

where $V_0$ denotes a maximum end-of-charge voltage (V) of the nonaqueous electrolyte secondary batteries when the battery module is charged fully at 25° C.

According to a third aspect of the present invention, there is provided an automobile comprising a storage battery system, the storage battery system comprising:

a battery module including nonaqueous electrolyte secondary batteries, each of the nonaqueous electrolyte secondary batteries comprising a negative electrode, a positive electrode and a nonaqueous electrolyte, the negative electrode including a negative electrode layer and a current collector having the negative electrode layer mounted thereon, and the negative electrode layer contains lithium-titanium composite oxide particles;

a dynamo which forms a regenerative power for charging the battery module;

a temperature sensor which measures a temperature of the battery module;

a voltmeter which measures a voltage of each of the nonaqueous electrolyte secondary batteries; and a charge control unit which controls a maximum end-of-charge voltage $V_1$ (V) of the nonaqueous electrolyte secondary batteries to fall within the range defined in formula (1) given below when the temperature of the battery module is not lower than 45° C. and is not higher than 90° C.:

$$0.85 \times V_0 \leq V_1 \leq 0.96 \times V_0 \tag{1}$$

where $V_0$ denotes a maximum end-of-charge voltage (V) of the nonaqueous electrolyte secondary batteries when the battery module is charged fully at 25° C.

BRIEF DESCRIPTION OF THE SEVERAL VIEWS OF THE DRAWING

FIG. 1 schematically shows a regenerative charging system according to a first embodiment of the present invention;

FIG. 2 is an oblique view, partly broken away, showing the unit cell included in the battery module shown in FIG. 1;

FIG. 6 is a block diagram showing the electric circuit included in the battery pack shown in FIG. 5;

FIG. 7 is an oblique view, partly broken away, schematically showing another example of a flattened type nonaqueous electrolyte secondary battery used in the battery pack shown in FIG. 5; and FIG. 8 is a cross-sectional view showing in a magnified fashion part A shown in FIG. 7.

DETAILED DESCRIPTION OF THE INVENTION

First Embodiment

Figure 3:
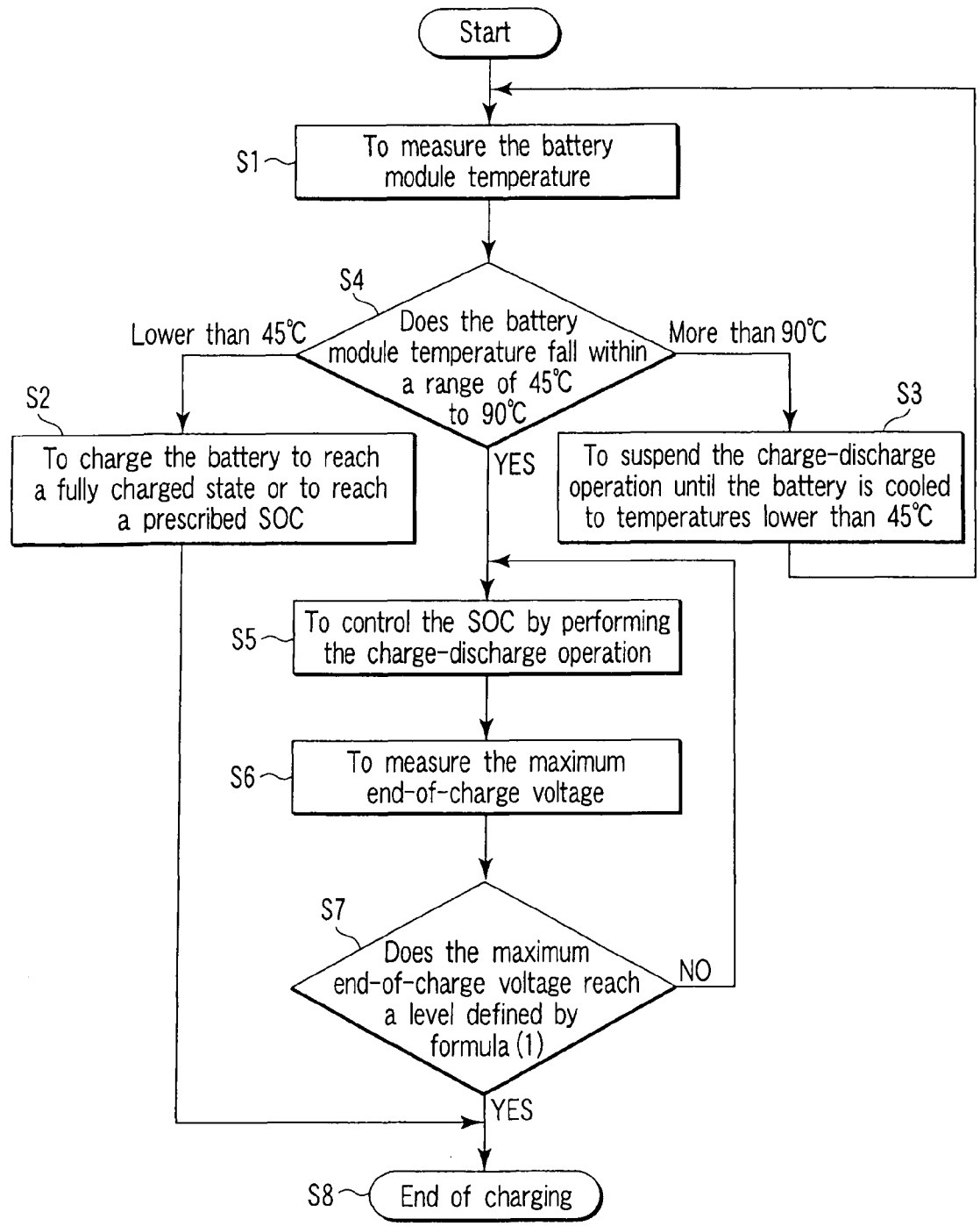
FIG. 3 is a flowchart showing the operation of the regenerative charging system shown in FIG. 1.

The present inventors have continued further research with attention paid to the situation that the battery module is swollen if the charging depth is increased under high temperatures in applying regenerative charging to the battery module of a nonaqueous electrolyte secondary battery comprising a negative electrode including a lithium-titanium composite oxide as the negative electrode active material. The present inventors find that the reducing decomposition potential of the nonaqueous solvent contained in the nonaqueous electrolyte is shifted toward the nobler side simultaneously with the shifting of the lithium absorbing potential of the lithium-titanium composite oxide toward the baser side. As a result, the potential difference between the reducing decomposition potential and the lithium absorbing potential is made small. It has been found that the potential difference that has been made small causes the reaction between the nonaqueous solvent and the lithium-titanium composite oxide so as to generate a gas and, thus, the battery module is swollen as pointed out above.

Further, it has been found that the swelling of the battery module in the regenerative charging system can be diminished by controlling the charging amount such that the maximum end-of-charge voltage $V_1$ (V) in the closed circuit of the unit cells each formed of the secondary batteries is allowed to satisfy formula (1) given below when the temperature of the battery module is no lower than 45° C. and no higher than 90° C.:

$$0.85 \times V_0 \leq V_1 \leq 0.96 \times V_0 \tag{1}$$

where $V_0$ denotes the maximum end-of-charge voltage (V) of the unit cells under the state of the closed circuit at the time when the battery module is charged fully at 25° C.

The state of being charged fully noted above denotes that the battery module is charged to reach its rated capacity. The rated capacity of the battery module represents the discharge capacity at the time when the battery module is discharged at a current corresponding to 0.2 CmA of the designed capacity.

Each of the maximum end-of-charge voltage $V_1$ and the maximum end-of-charge voltage $V_0$ denotes the voltage value of the unit cell exhibiting the maximum end-of-charge voltage among all the unit cells constituting the battery module.

Since the unit cells constituting the battery module have distributions in the capacity and impedance, a difference in charged voltage is generated among the unit cells when the battery module is fully charged. It follows that the charged voltage of the unit cell having a small capacity or a large impedance tends to provide the maximum end-of-charge voltage. As a result, in order to maintain a long life performance of the storage battery system, it is important to control the storage battery system by the maximum end-of-charge voltage of the unit cells.

If the maximum end-of-charge voltage $V_1$ (V) exceeds $0.96 \times V_0$, the difference between the lithium absorbing potential of the lithium-titanium composite oxide and the reducing decomposition potential of the nonaqueous solvent is made small so as to generate a large amount of gases, thereby swelling the battery module. On the other hand, if the maximum end-of-charge voltage $V_1$ (V) is lower than $0.85 \times V_0$, the charging capacity is made deficient so as to lower the output characteristics of the battery module. Such being the situation, the maximum end-of-charge voltage $V_1$ (V) is set in a manner to satisfy formula (1) given above. It is more desirable for the maximum end-of-charge voltage $V_1$ (V) to satisfy the condition of $0.9 \times V_0 \leq V_1 \leq 0.96 \times V_0$.

In the case of using an aluminum foil or an aluminum alloy foil as the negative electrode current collector, it is possible to improve the heat dissipating properties of the negative electrode and to enhance the uniformity of the temperature distribution within the unit cell. As a result, the nonuniformity in the temperature within the unit cell and among the unit cells can be diminished so as to improve the charge-discharge cycle life of the battery module.

If the rated capacity of the unit cell is increased, the heat distribution tends to be inclined. It follows that it is more effective to use an aluminum foil or an aluminum alloy foil as the negative electrode current collector in this sense, too.

It should also be noted that it is desirable for the aluminum foil or the aluminum alloy foil used as the negative electrode current collector to have an average crystal grain size no larger than 50 µm. In the case where the negative electrode current collector is formed of an aluminum or an aluminum alloy foil having an average crystal grain size no larger than 50 µm, it is possible to improve the heat dissipating properties and the chemical stability of the negative electrode, with the result that the gas generation amount can be suppressed in applying regenerative charging to the battery module under high temperatures.

First embodiment of the present invention will now be described with reference to the accompanying drawings.

FIG. 1 schematically shows the construction of a regenerative charging system according to first embodiment of the present invention. FIG. 2 is an oblique view, partly broken away, showing the construction of a unit cell included in the battery module shown in FIG. 1. FIG. 3 is a flowchart showing the operation of the regenerative charging system shown in FIG. 1. Further, FIG. 4 is a block diagram showing the relationship between the battery module shown in FIG. 1 and a battery control unit.

As shown in FIG. 1, the regenerative charging system 1 comprises a booster mechanism 2, a battery module 3 connected to the booster mechanism 2, and a battery control unit (BMU) 4 connected to the battery module 3. The battery module 3 comprises a module prepared by connecting in series or in parallel a plurality of unit cells each formed of a flattened type nonaqueous electrolyte secondary battery. FIG. 2 exemplifies the construction of the flattened type nonaqueous electrolyte secondary battery. As shown in FIG. 2, the flattened type nonaqueous electrolyte secondary battery comprises a flattened electrode group 11 prepared by spirally winding a laminated sheet comprising a positive electrode 12, a negative electrode 13, and a separator 14 interposed between the positive electrode 12 and the negative electrode 13. The electrode group 11 is prepared by, for example, spirally winding in a flattened shape a laminated sheet comprising the positive electrode 12, the negative electrode 13 and the separator 14 interposed between the positive electrode 12 and the negative electrode 13, followed by applying a pressing treatment under heat to the wound structure of the laminate sheet. It is possible for the positive electrode 12, the negative electrode 13 and the separator 14 to be formed integrally by using a polymer material having an adhesivity. A band-like positive electrode terminal 15 is electrically connected to the positive electrode 12, On the other hand, a band-like negative electrode terminal 16 is electrically connected to the negative electrode 13. The electrode group 11 is housed in a case 17 formed of a laminate film such that the edge portions of the positive electrode terminal 15 and the negative electrode terminal 16 protrude from the case 17. Incidentally, the case 17 formed of the laminate film is sealed by means of a heat seal.

Figure 4:
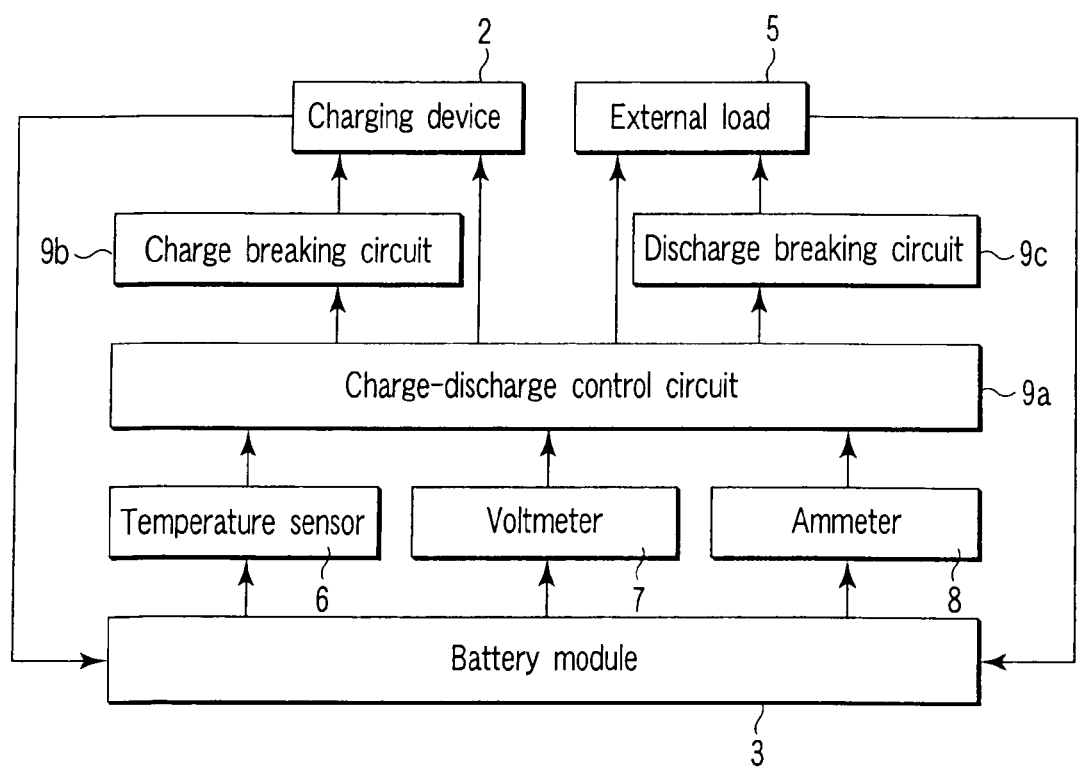
FIG. 4 is a block diagram showing the relationship between the battery module shown in FIG. 1 and the battery control unit.

As shown in FIG. 4, the battery control unit (BMU) (see FIG. 1) includes a temperature sensor, e.g., a thermocouple or a thermistor 6, for measuring the temperature of the battery module 3, a voltmeter 7 for measuring the voltage of the battery module and the voltage of the unit cell, an ammeter 8 for measuring the current flowing within the battery module, a charge-discharge control circuit 9a, a charge breaking circuit 9b and a discharge breaking circuit 9c.

Supplied to the charge-discharge control circuit 9a are the results of the measurement of the temperature sensor 6, the voltmeter 7 and the ammeter 8. Based on these input signals, signals are supplied to the charge breaking circuit 9a and the discharge breaking circuit 9c so as to control the charge-discharge of the battery module 3.

To be more specific, the charge-discharge control unit 9a sets the state of charge (SOC) based on the result of the measurement and transmits the result of the measurement to the charge breaking circuit 9b and the discharge breaking circuit 9c. It is possible for the charge breaking circuit 9b or the discharge breaking circuit 9c to calculate the charging amount required for achieving the set SOC. In the case of FIG. 1, an arithmetic calculation is performed within the charge breaking circuit 9b and the result of the calculation is transmitted to the charge-discharge control circuit 9a. When the charged amount has reached a prescribed value as a result of the charge-discharge operation of the battery module 3, an electric signal is supplied from the charge-discharge control circuit 9a to each of the charge breaking circuit 9b and the discharge breaking circuit 9c so as to stop the charging and the discharging, thereby controlling the SOC at a prescribed value.

The regenerative charging system 1 of the construction described above is joined to a DC motor and a dynamo 5 of the automobile, which act as an external load. The automobile noted above includes, for example, a hybrid automobile and an electric automobile having two to four wheels. The dynamo connected to a DC motor is connected to the booster mechanism 2 of the regenerative charging system. Also, the booster mechanism 2 plays the role of a charger for supplying regenerative power to the battery module 3. On the other hand, the BMU 4 of the regenerative charging system is connected to the DC motor. The particular construction makes it possible to control the output from the battery module 3 to the DC motor in accordance with the signals generated from the charge-discharge control circuit 9a and the discharge breaking circuit 9c.

The operation of the regenerative charging system will now be described with reference to FIG. 3.

The power generated by the dynamo in accordance with the driving of the DC motor of, for example, a hybrid automobile is boosted by the booster mechanism 2 and, then, supplied to the battery module 3. Where the battery module 3 is charged (input), the temperature of the battery module 3 is monitored by the temperature sensor 6 of the BMU 4 included in the regenerative charging system 1, and the information on the temperature is transmitted to the charge-discharge control circuit 9a every time the temperature is monitored by the temperature sensor 6. If the temperature of the battery module 3 is lower than 45° C., the charge-discharge control circuit 9a is fully charged or is charged until a prescribed state of charge (SOC) is reached so as to finish the charging (step S2). Also, if the temperature of the battery module 3 exceeds 90° C., an electric signal is transmitted to each of the charge breaking circuit 9b and the discharge breaking circuit 9c so as to set up a waiting state in which the charging (input) and the discharging (output) are stopped (step S3). As a result, the heat generation from the battery is stopped so as to cool the battery to temperatures lower than 45° C. It is desirable for the battery module 3 to be cooled to 30° C. or lower.

On the other hand, where the temperature of the battery module 3 falls within a range of 45° C. to 90° C. (step S4), a charge starting signal or a discharge starting signal is supplied from the BMU 4 into the battery module 3. As a result, it is possible for the maximum end-of-charge voltage $V_1$ to be set to fall within the range defined in formula (1) while controlling the battery module 3 at a prescribed state of charge (SOC) (step S5). It is desirable for the prescribed state of charge (SOC) to be set at 60 to 90% of the fully charged state.

The voltage and current of the battery module 3 and the unit cell are monitored in the BMU 4 (step S6). In the charge-discharge control circuit 9a, the maximum end-of-charge voltage $V_1$ under the state of the closed circuit of the unit cell is compared with the maximum end-of-charge voltage $V_0$ that is supplied in advance to the BMU 4. A signal is generated to the charge-discharge control circuit 9a at the time when the maximum end-of-charge voltage $V_1$ is changed to reach a level defined by formula (1) given previously (step S7) so as to finish the charging (step S8).

According to the system described above, it is possible to permit the maximum end-of-charge voltage $V_1$ of the unit cells to fall within the range defined in formula (1) given previously. In addition, it is possible to suppress the temperature elevation of the battery module that is caused by the charging. It follows that it is possible to suppress the swelling of the battery module caused by the charging. It should also be noted that, since the charging capacity is controlled by the discharge, it is possible to permit without fail the maximum end-of-charge voltage $V_1$ to fall within the range defined by formula (1) given previously and to provide the regenerative charging system having a simple structure.

Incidentally, a cooling fan is not incorporated in the regenerative charging system shown in FIG. 1. However, it is also possible to introduce a cooling fan so as to cool the battery module. In this case, it is more desirable to control the battery module 3 at a prescribed state of charge (SOC) such that the maximum end-of-charge voltage $V_1$ falls within the range defined in formula (1) and to control the temperature of the battery module 3 at the range of 45 to 60° C. Where the temperature of the battery module 3 exceeds 60° C., it is desirable to cool the battery module 3 to 30° C. or lower, with the charge-discharge of the battery module 3 set under the waiting state (stopped state). By this control, it is possible to further improve the life performance of the battery module and to suppress the lowering of the output performance.

It is also possible to use an AC motor in place of the DC motor. In the case of using an AC motor, however, it is necessary to use a rectifier.

The negative electrode, the positive electrode, the separator, the nonaqueous electrolyte and the case of a flattened type nonaqueous electrolyte secondary battery will now be described.

1) Negative Electrode:

The negative electrode includes a negative electrode current collector and a negative electrode layer formed on one surface or both surfaces of the negative electrode current collector and containing a negative electrode active material, a conductive agent and a binder.

The negative electrode active material contains a lithium-titanium composite oxide. The lithium-titanium composite oxide used includes, for example, lithium titanate, e.g., Spinel type $Li_{4+x}Ti_5O_{12}$, where x satisfies $-1 \leq x \leq 3$, preferably x should satisfy $0 \leq x < 1$. Particularly, it is desirable to use lithium titanate among the lithium-titanium composite oxides noted above in view of the charge-discharge cycle performance. It should be noted in this connection that lithium titanate has a lithium absorbing potential of about 1.5 V and, thus, is highly stable electrochemically relative to an aluminum foil current collector or an aluminum alloy foil current collector.

In addition to the Spinel type lithium titanate referred to above, it is also possible to use a ramsdellite type lithium titanate such as $Li_{2+x}Ti_3O_7$ ($-1 \leq x \leq 3$) as the lithium-titanium composite oxide. The oxides including the lithium titanate having a spinel structure and the lithium titanate having a ramsdellite structure are called herein lithium-titanium oxide. In addition to the lithium-titanium oxide, a titanium series oxide that does not contain lithium can also be used as the lithium-titanium composite oxide. The titanium series oxide includes, for example, $TiO_2$ and a metal composite oxide containing Ti and at least one element selected from the group consisting of P, V, Sn, Cu, Ni and Fe. It is desirable for $TiO_2$ to be of anatase type and to have a low crystallinity caused by a heat treating temperature of 300 to 500° C. On the other hand, the metal composite oxide, which contains Ti and at least one element selected from the group consisting of P, V, Sn, Cu, Ni and Fe, includes, for example, $TiO_2$—$P_2O_5$, $TiO_2$—$V_2O_5$, $TiO_2$—$P_2O_5$—$SnO_2$, and $TiO_2$—$P_2O_5$-MeO. Me is at least one element selected from the group consisting of Cu, Ni and Fe. It is desirable for the metal composite oxide to have a low crystallinity and to have a microstructure in which a crystalline phase and an amorphous phase are present together or an amorphous phase alone is present. In the case of forming such a microstructure, the metal composite oxide permits markedly improving the charge-discharge cycle performance. Particularly, it is desirable to use lithium-titanium oxide and a metal composite oxide containing Ti and at least one element selected from the group consisting of P, V, Sn, Cu, Ni and Fe.

It is possible for the negative electrode to contain another kind of the negative electrode active material in addition to the lithium-titanium composite oxide material. The other kind of the negative electrode active material noted above includes, for example, a carbonaceous material capable of absorbing-releasing lithium or lithium ions.

It is desirable for the negative electrode active material to have an average particle diameter no larger than 1 µm. In the case of using a negative electrode active material having an average particle diameter no larger than 1 µm, it is possible to improve the charge-discharge cycle performance of the nonaqueous electrolyte secondary battery. Particularly, the produced effect is made prominent in the rapid charging stage and the high rate discharge stage. It should be noted in this connection that, in the negative electrode active material capable of absorbing-releasing lithium ions, the diffusion distance of the lithium ion is made short within the active material with decrease in the particle diameter of the negative electrode active material so as to increase the specific surface area of the negative electrode active material. It is more desirable for the negative electrode active material to have an average particle diameter no larger than 0.3 µm. It should be noted, however, that, if the negative electrode active material has an excessively small average particle diameter, the particles of the negative electrode active material tend to be agglomerated so as to lower possibly the homogeneity of the negative electrode. It is desirable for the lower limit of the average particle diameter of the negative electrode active material to be set at 0.001 µm.

For obtaining the negative electrode active material having 1 µm or less of an average particle diameter, it is desirable to synthesize first a powdery material having an average particle diameter no larger than 1 µm as a precursor of the negative electrode active material by the reaction of the raw material of a negative electrode active material, or to pulverize the synthesized powdery material after the baking treatment by using a pulverizing device such as a ball mill or a jet mill, thereby obtaining the desired negative electrode active material having an average particle diameter no larger than 1 µm.

The average particle diameter of the negative electrode active material is measured by using, for example, a Laser Diffraction Particle Size Analyzer (model SALD-300 of Shimadzu Corporation). To be more specific, about 0.1 g of the sample, a surfactant, and 1 to 2 mL of a distilled water are put in a beaker. After the materials put in the beaker are sufficiently stirred, the mixed materials are poured into a stirring water vessel, and the light intensity distribution is measured every 2 seconds and measured 64 times in total so as to analyze the grain size distribution data.

It is desirable for the negative electrode current collector to be formed of an aluminum foil or an aluminum alloy foil. Also, it is desirable for the aluminum foil or the aluminum alloy foil to have an average crystal grain size no larger than 50 µm, more desirably, no larger than 10 µm. The chemical and physical strength of the negative electrode current collector is increased with decrease in the average crystal grain size noted above. However, since it is desirable for the fine texture to be crystalline in order to obtain an excellent electric conductivity, it is desirable for the lower limit of the average crystal grain size to be set at 0.01 µm.

The mechanical strength of the aluminum foil or the aluminum alloy foil can be markedly improved by setting the average crystal grain size to 50 µm or less. If the mechanical strength of the negative electrode current collector is increased, the resistance of the negative electrode current collector to the physical impact and to the chemical corrosion can be increased so as to make it possible to suppress the breakage of the negative electrode current collector. In particular, it is possible to prevent the negative electrode current collector from being dissolved and corroded, e.g., the dissolution and corrosion in the over-discharge cycle under a high temperature environment of 40° C. or higher. As a result, it is possible to suppress the increase in the electric resistance of the electrode. Further, since the increase in the electric resistance of the electrode is lowered, the joule heat is lowered so as to suppress the heat generation from the electrode.

It should also be noted that, if the mechanical strength of the negative electrode current collector is increased, the current collector is not broken even if a high pressure is applied to the negative electrode in the pressing stage. It follows that the density of the negative electrode can be increased so as to improve the capacity density.

In general, the load to the negative electrode current collector is increased in pressing the electrode with decrease in the average particle diameter of the negative electrode active material. It is desirable to use an aluminum foil having an average crystal grain size no larger than 50 μm or an aluminum alloy foil having an average crystal grain size no larger than 50 μm. In this case, the negative electrode current collector is made capable of withstanding the strong load that is generated in pressing the electrode containing the negative electrode active material having an average particle diameter no larger than 1 μm so as to make it possible to avoid the breakage of the negative electrode current collector in the pressing stage.

It should also be noted that the heat conductivity is increased by increasing the density of the negative electrode so as to improve the heat dissipating properties of the electrode. Further, the suppressed heat generation from the battery and the improvement in the heat dissipating properties of the electrode produce a synergetic effect so as to suppress the temperature elevation of the battery.

The aluminum foil or the aluminum alloy foil having an average crystal grain size no larger than 50 μm is affected by various factors such as the composition of the material, the impurities, the process conditions, the heat treatment history, as well as the heating conditions and the cooling conditions in the annealing process. Such being the situation, the various factors exemplified above are combined in the manufacturing process of the negative electrode current collector so as to control the crystal grain diameter noted above. Incidentally, it is possible to obtain the negative electrode current collector by using PACAL 21 (trade name, manufactured by Nippon Seihaku K.K.).

To be more specific, the aluminum foil having an average crystal grain size no larger than 50 μm can be manufactured by applying an annealing treatment to an aluminum foil having 90 μm of an average crystal grain size at 50 to 250° C., followed by cooling the annealed aluminum foil to room temperature. On the other hand, the aluminum alloy foil having an average crystal grain size no larger than 50 μm can be manufactured by applying an annealing treatment to an aluminum alloy foil having 90 μm of an average crystal grain size at 50 to 250° C., followed by cooling the annealed aluminum alloy foil to room temperature.

The average crystal grain size of aluminum and the aluminum alloy is measured by the method described in the following. Specifically, the texture on the surface of the negative electrode current collector is observed with a metallurgical microscope so as to count the number n of the crystal grains within the view field of 1 mm×1 mm, and the average crystal grain area S (μm²) is calculated by formula (2) given below:

$$S=(1\times10^6)/n \quad (2)$$

where the value represented by $(1\times10^6)$ denotes the area (μm²) of the view field of 1 mm×1 mm and n denotes the number of crystal grains.

Then, an average crystal grain size d (μm) is calculated by using formula (3) given below, which involves the average crystal grain area S thus obtained. The calculation of the average crystal grain size d is carried out at 5 points (5 view fields), and the average value of the calculation is used as the average crystal grain size. Incidentally, the assumed error is about 5%.

$$d=2(S/\pi)^{1/2} \quad (3)$$

It is desirable for the negative electrode current collector to have a thickness no larger than 20 μm. Also, it is desirable for the aluminum foil to have a purity of at least 99.99%. It is desirable for the aluminum alloy to be an alloy containing an element of magnesium, zinc, manganese, or silicon. On the other hand, it is desirable for the amount of the transition metals such as iron, copper, nickel and chromium, which are contained in the aluminum alloy, to be no larger than 100 ppm.

A carbon material can be used as an electrically conductive material. For example, it is possible to use an acetylene black, a carbon black, coke, a carbon fiber or graphite as the electrically conductive agent.

The binder includes, for example, polytetrafluoro ethylene (PTFE), polyvinylidene fluoride (PVdF), a fluorine series rubber and a styrene-butadiene rubber.

Concerning the mixing ratio of the negative electrode active material, the electrically conductive agent, and the binder, it is desirable for the negative electrode active material to be used in an amount of 80 to 95% by weight, for the electrically conductive agent to be used in an amount of 3 to 18% by weight, and for the binder to be used in an amount of 2 to 7% by weight.

The negative electrode can be manufactured by, for example, the process steps of suspending the negative electrode active material, the electrically conductive agent and the binder in a suitable solvent, coating the current collector formed of an aluminum foil or an aluminum alloy foil with the resultant suspension, and drying and pressing the current collector coated with the suspension.

It is desirable for the negative electrode layer formed on one surface of the negative electrode current collector to have a thickness of 5 to 100 μm. Particularly, where the thickness of the negative electrode layer noted above falls within a range of 5 to 50 μm, the heat conductivity of the negative electrode can be increased during the charge-discharge cycle under a large current so as to make it possible to suppress a rapid heat generation.

2) Positive Electrode:

The positive electrode comprises a positive electrode current collector and a positive electrode layer supported on one surface or both surfaces of the positive electrode current collector and containing a positive electrode active material, an electrically conductive agent and a binder.

The positive electrode current collector includes, for example, an aluminum foil or an aluminum alloy foil. It is desirable for the positive electrode current collector to have an average crystal grain size no larger than 50 μm, more desirably no larger than 10 μm, like the negative electrode current collector described above. If the average crystal grain size is no larger than 50 μm, it is possible to drastically improve the mechanical strength of the aluminum foil or the aluminum alloy foil. As a result, where the aluminum foil and aluminum alloy foil have the average crystal grain size of no larger than 50 μm, it is possible to apply a high pressure to the positive electrode so as to increase the density of the positive electrode. It follows that the capacity density of the positive electrode can be improved. It should also be noted that the pin hole occurrence and the crack occurrence can be suppressed with decrease in the average crystal grain size. At the same time, it is possible to increase the chemical strength and the physical strength of the positive electrode current collector. In order to permit the positive electrode current collector to have an appropriate hardness having a crystalline fine texture, it is desirable to set the lower limit of the average crystal grain size at 0.01 µm.

It is desirable for the positive electrode current collector to have a thickness no larger than 20 µm.

The positive electrode active material includes, for example, an oxide, a sulfide and a polymer.

The positive electrode active material includes metal oxides, e.g., manganese dioxide such as $MnO_2$, iron oxide, copper oxide, nickel oxide, composite oxides such as lithium-manganese composite oxides such as $Li_xMnO_4$ and $Li_xMnO_2$, lithium-nickel composite oxides such as $Li_xNiO_2$, lithium-cobalt composite oxides such as $Li_xCoO_2$, lithium-nickel-cobalt composite oxides such as $LiNi_{1-y}Co_yO_2$, lithium-manganese-cobalt composite oxides such as $LiMn_yCo_{1-y}O_2$, the Spinel type lithium-manganese-nickel composite oxides such as $Li_xMn_{2-y}Ni_yO_4$, lithium phosphate oxides having an olivine structure such as $Li_xFePO_4$, $Li_xFe_{1-y}Mn_yPO_4$, and $Li_xCoPO_4$, an iron sulfide such as $Fe_2(SO_4)_3$, and vanadium oxide such as $V_2O_5$. Incidentally, it is desirable for the each of the molar ratios x and y in the chemical formulas given above to fall within a range of 0 to 1 unless otherwise specified.

The polymer as the positive electrode active material includes, for example, a conductive polymer material such as polyaniline and polypyrrole and a disulfide series polymer material. It is also possible to use, for example, sulfur (S) and a fluorocarbon as the positive electrode active material.

The positive electrode active material that is desirable includes, for example, a lithium-manganese composite oxide, a lithium-nickel composite oxide, a lithium-cobalt composite oxide, a lithium-nickel-cobalt composite oxide, the Spinel type lithium-manganese-nickel composite oxide, a lithium-manganese-cobalt composite oxide, and lithium iron phosphate. The positive electrode active materials exemplified above make it possible to obtain a high positive electrode voltage. Particularly, in the case of using a lithium-manganese composite oxide, a lithium-nickel composite oxide, a lithium-cobalt composite oxide, a lithium-nickel-cobalt composite oxide and a lithium-manganese-cobalt composite oxide, it is possible to suppress the reaction between each of the positive electrode active material and the negative electrode active material with a nonaqueous electrolyte under a high temperature environment so as to improve markedly the life of the battery.

It is also desirable to use a lithium-nickel-cobalt-manganese composite oxide represented by $Li_aNi_bCo_cMn_dO_2$, where the molar ratios a, b, c and d are $0 \leq a \leq 1.1$, $b+c+d=1$. In the case of using the lithium-nickel-cobalt-manganese composite oxide, it is possible to obtain a high battery voltage. It is more desirable for the molar ratios a, b, c and d to be $0 \leq a \leq 1.1$, $0.1 \leq b \leq 0.5$, $0 \leq c \leq 0.9$, and $0.1 \leq d \leq 0.5$.

The electrically conductive agent includes, for example, an acetylene black, a carbon black, and graphite.

The binder includes, for example, polytetrafluoro ethylene (PTFE), polyvinylidene fluoride (PVdF), and a fluorine series rubber.

Concerning the mixing ratio of the positive electrode active material, the electrically conductive agent, and the binder, it is desirable for the positive electrode active material to be used in an amount of 80 to 95% by weight, for the electrically conductive agent to be used in an amount of 3 to 18% by weight, and for the binder to be used in an amount of 2 to 7% by weight.

The positive electrode can be manufactured by, for example, the process steps of suspending the positive electrode active material, the electrically conductive agent and the binder in a suitable solvent, coating the current collector formed of an aluminum foil or an aluminum alloy foil with the resultant suspension, and drying and pressing the current collector coated with the suspension.

It is desirable for the positive electrode layer formed on one surface of the positive electrode current collector to have a thickness of 5 to 100 µm. Particularly, where the thickness of the positive electrode layer noted above falls within a range of 5 to 50 µm, the heat conductivity of the positive electrode can be increased during the charge-discharge cycle under a large current so as to make it possible to suppress a rapid heat generation.

3) Separator:

The separator includes, for example, a synthetic resin unwoven fabric, a polyethylene porous film, and a polypropylene porous film.

4) Nonaqueous Electrolyte

The nonaqueous electrolyte includes a liquid nonaqueous electrolyte prepared by dissolving an electrolyte in an organic solvent, a gel-like nonaqueous electrolyte formed of a composite material containing the liquid nonaqueous electrolyte and a polymer material, and a solid nonaqueous electrolyte formed of a composite material containing a lithium salt electrolyte and a polymer material. It is also possible to use an ionic liquid containing lithium ions as the nonaqueous electrolyte.

The liquid nonaqueous electrolyte can be prepared by dissolving an electrolyte in an organic solvent in a concentration of 0.5 to 2 mol/L.

The electrolytes include, for example, $LiClO_4$, $LiPF_6$, $LiBF_4$, $LiAsF_6$, $LiCF_3SO_3$, $LiN(CF_3SO_2)_2$, $LiN(C_2F_5SO_2)_2$, $Li(CF_3SO_2)_3C$, and $LiB[(OCO)_2]_2$. These electrolyte compounds can be used singly or in the form of a mixture of a plurality of the electrolyte compounds exemplified above.

The organic solvents include, for example, cyclic carbonate such as propylene carbonate (PC) or ethylene carbonate (EC); a linear carbonate such as diethyl carbonate (DEC), dimethyl carbonate (DMC) or methyl ethyl carbonate; a linear ether such as dimethoxy ethane (DME) or diethoxy ethane (DEE); a cyclic ether such as tetrahydrofuran (THF) or dioxofuran (DOX), as well as γ-butyrolactone (GBL), acetonitrile (AN), and sulfolane (SL). These organic solvents can be used singly or in the form of a mixed solvent. In the case of using a nonaqueous electrolyte containing GBL, it is possible to decrease the amount of the gas generated in the stage of charging the secondary battery. It is more desirable for the organic solvent to contain at least one solvent compound selected from the group consisting of PC and EC in addition to GBL.

The polymer material includes, for example, polyvinylidene fluoride (PVdF), polyacrylonitrile (PAN), and polyethylene oxide (PEO).

Further, the ionic liquid is formed of lithium ions, organic cations and organic anions and should desirably be in the form of a liquid under temperatures no higher than 100° C., preferably no higher than room temperature.

5) Case:

Concerning the case, it is possible to use a metal case instead of the laminate film case shown in FIG. 2 referred to previously. Also, the case is of a flattened shape, a prismatic shape, a cylindrical shape, a coin type, a button type, a sheet type, or of a laminate type and includes a case of a large battery mounted to, for example, an electric automobile.

The laminate film used for forming the case includes, for example, a multi-layered film including a metal layer and a resin layer covering the metal layer. For decreasing the weight of the battery, it is desirable for the metal layer to be formed of an aluminum foil or an aluminum alloy foil. On the other hand, the resin layer reinforces the metal layer. The resin layer is formed of a polymer material such as polypropylene (PP), polyethylene (PE), Nylon, and polyethylene terephthalate (PET).

The laminate film case can be obtained by bonding the periphery of superposed laminate films by the heat sealing.

It is desirable for the laminate film to have a thickness no larger than 0.5 mm. Also, it is desirable for the lower limit in the thickness of the laminate film to be set at 0.01 mm.

It is desirable for the metal case to be formed of aluminum or an aluminum alloy. Also, it is desirable for aluminum and the aluminum alloy to have an average crystal grain size no larger than 50 µm. Where the average crystal grain size is no larger than 50 µm, it is possible to increase the mechanical strength of the metal case formed of aluminum or the aluminum alloy so as to make it possible to secure a sufficient mechanical strength even if the thickness of the case is decreased. It follows that it is possible to improve the heat dissipating properties of the case so as to suppress the temperature elevation of the battery. It is also possible to improve the energy density of the battery so as to make it possible to decrease the weight of the battery and to miniaturize the battery. Incidentally, it is more desirable for the average crystal grain size of aluminum or the aluminum alloy to be no larger than 10 µm. The chemical and physical strength of the case can be increased with decrease in the average crystal grain size noted above. However, since it is desirable for the material of the case to have a crystalline fine texture in order to obtain an excellent electric conductivity, it is desirable for the lower limit in the average crystal grain size to be set at 0.01 µm.

The features noted above are adapted for the battery requiring, for example, a high temperature condition and a high energy density such as a secondary battery mounted to a vehicle.

It is desirable for the metal case to have a thickness no larger than 0.5 mm. Also, it is desirable for the lower limit in the thickness of the metal case to be set at 0.05 mm.

It is desirable for the aluminum foil to have a purity no lower than 99.99%. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium to be no larger than 100 ppm.

The open portion of the metal case can be sealed by irradiation with a laser beam. This makes it possible to decrease the volume of the sealing portion, compared with the laminate film case, so as to improve the energy density.

Second Embodiment

The storage battery system according to the first embodiment of the present invention can be suitably used not only in the case of charging the battery by the regenerative power but also in the case of rapidly charging the battery under a high temperature environment no lower than 45° C. The particular situation of the rapid charging under a high temperature environment includes, for example, a power supply device for a digital camera, a power supply device for a lightweight vehicle such as an assist bicycle, a back-up power supply device for a personal computer and a factory (UPS: Uninterruptible Power Supply device), and a cleaning machine.

It is possible for the storage battery system according to the second embodiment of the present invention to be substantially equal to the storage battery system according to the first embodiment of the present invention described above, except that a regenerative power is not used for charging the storage battery according to the second embodiment of the present invention. It is desirable for the charging rate to be no lower than 2 C and no higher than 120 C. Incidentally, the charging rate 1 C denotes the current value required for completely discharging the unit cell in one hour. For convenience, the current value of 1 C can be replaced by the numeral value of the nominal capacity of the unit cell.

It should be noted here that the nominal capacity is the typical capacity of the unit cell. On the other hand, the rated capacity of a battery means the minimum guaranteed capacity of the battery, which may vary depending on the dispersion in quality between lots, which inevitably results in the mass-production process.

Figure 5:
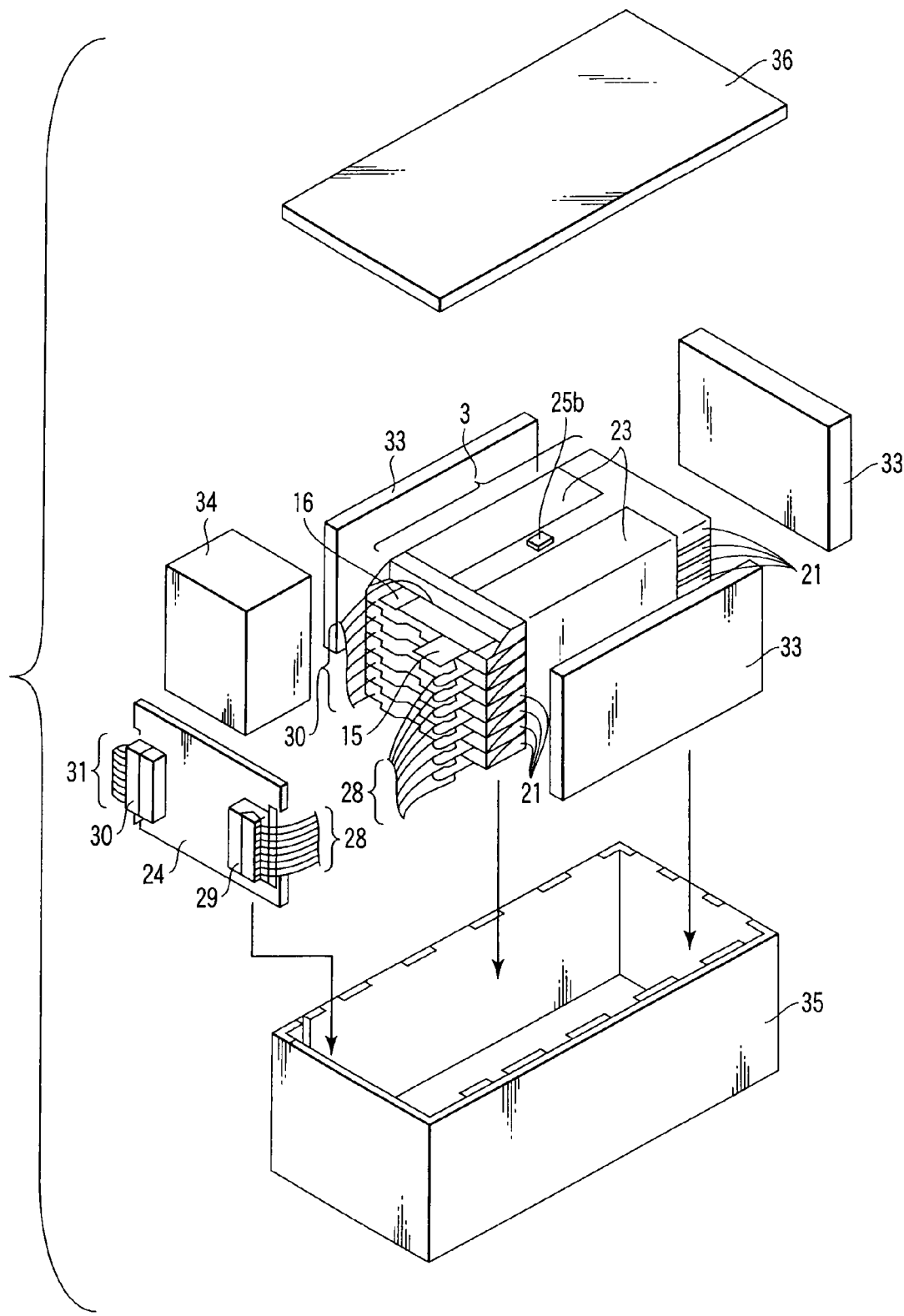
FIG. 5 is an oblique view showing in a dismantled fashion the battery pack used in a storage battery system according to a first embodiment and a second embodiment of the present invention.

In the storage battery system according to each of the first and second embodiments of the present invention, it is possible to use a battery pack having the battery module 3 and the battery control unit (BMU) 4 housed in a single case. In the storage battery system according to the second embodiment of the present invention, it is unnecessary to employ the input by the regenerative power, with the result that the battery pack can be used as the storage battery system. The construction of the battery pack will now be described with reference to FIGS. 5 and 6. FIG. 5 is an oblique view showing in a dismantled fashion the construction of the battery pack used in the storage battery system according to the second embodiment of the present invention. On the other hand, FIG. 6 is a block diagram showing the electric circuit of the battery pack shown in FIG. 5.

As shown in FIG. 5, the battery pack comprises a plurality of unit cells 21. The unit cell 21 is formed of the flattened type nonaqueous electrolyte secondary battery shown in FIG. 2. The plural unit cells 21 are stacked one upon the other in the thickness direction with the protruding directions of the positive electrode terminals 15 and the negative electrode terminals 16 aligned. As shown in FIG. 6, the unit cells 21 are connected in series so as to form the battery module 3. As shown in FIG. 5, the battery module 3 is made integral by using adhesive tapes 23.

It is desirable for the rated capacity of the unit cell 21 to be set at 2 A or more and 100 A or less. It is more desirable for the rated capacity of the unit cell 21 to be 3 A or more and 40 A or less. Further, it is desirable for the rated capacity of the unit cell mounted to a hybrid automobile to be 3 Ah or more and 15 Ah or less. Also, it is desirable for the rated capacity of the unit cell mounted to an electric automobile or UPS to be 15 Ah or more and 40 Ah or less. Incidentally, the term "rated capacity" represents the capacity of the unit cell when the unit cell is discharged at the discharge rate of 0.2 C.

It is desirable for the storage battery system according to the second embodiment of the present invention to include at least 5 and not more than 500 unit cells 21, more desirably at least 5 and not more than 200 unit cells 21. Further, it is desirable for the storage battery system, which is mounted to a hybrid automobile or an electric automobile, to include at least 5 and not more than 200 unit cells 21. Also, it is desirable for the storage battery system for UPS to include at least 5 and not more than 1,000 unit cells 21. Also, where the storage battery system is mounted to a vehicle, it is desirable for the unit cells 21 to be connected in series in order to obtain a high voltage.

A printed wiring board 24 is arranged on the side surface toward which protrude the positive electrode terminals 15 and the negative electrode terminals 16. As shown in FIG. 6, an instrument section 25a of a thermistor, a protective circuit 26 and a terminal 27 for the power supply to an external equipment are mounted to the printed wiring board 24.

It is possible for the measuring section 25b (see FIG. 5) of the thermistor to be arranged in all of the plural unit cells 21 or in some optional unit cells selected from the plural unit cells 21. Where the measuring section 25b of the thermistor is arranged in some of the unit cells 21, it is absolutely necessary for the measuring section 25b to be arranged in the unit cell 21 positioned in the middle stage of the battery module 3. Where the measuring section 25b is arranged in all of the unit cells 21 or only in some of the unit cells 21, the highest detection temperature is set as the temperature of the battery module 3. Also, it is desirable for the measuring section 25b of the thermistor to be arranged in the center in the planar section of the unit cell 21. The result of the measurement by the thermistor is transmitted as a detection signal to the protective circuit 26.

As shown in FIGS. 5 and 6, a wiring 28 on the side of the positive electrode of the battery module 3 is electrically connected to a connector 29 on the side of the positive electrode of the protective circuit 26. Further, a wiring 30 on the side of the negative electrode of the battery module 3 is electrically connected to a connector 31 on the side of the negative electrode of the protective circuit 26 of the printed wiring board 24.

The protective circuit 26 comprises a charge-discharge control circuit, a charge breaking circuit, a discharge breaking circuit, a voltmeter, and an ammeter. A wiring 32 for detecting the voltage and the current is connected to each of the unit cells 21 such that the detection signal is transmitted to the protective circuit 26 via these wirings 32. A charger and an external load are connected to the terminal 27 for the power supply to the external equipment.

The protective circuit 26 plays the role of not only the battery control unit but also plays the role of breaking a wiring 31a on the positive side and a wiring 31b on the negative side between the protective circuit 26 and the terminal 27 under prescribed conditions. The prescribed conditions include, for example, the situation that the temperature detected by thermistor exceeds a prescribed temperature and the situation that, for example, an over-charging, an over-discharging and an over current have been detected. The detecting method is applied to each of the unit cells 21 or to the battery modules 3. Where each of the unit cells 21 are detected, it is possible to detect either the battery voltage, or the positive electrode potential or the negative electrode potential. In the latter case, a lithium electrode used as a reference electrode is inserted into each of the unit cells 21.

Protective sheets 33 each formed of rubber or resin are arranged on three side surfaces of the battery module 3 other than the side surface toward which protrude the positive electrode terminal 15 and the negative electrode terminal 16. Also, a protective block 34 formed of rubber or resin is arranged between the side surface of the battery module 3 toward which extrude the positive electrode terminal 15 and the negative electrode terminal 16 and the printed wiring board 24.

The battery module 3 is housed in a housing vessel 35 together with the protective block 34 and the printed wiring board 24. To be more specific, the protective sheets 33 are arranged respectively on the both inner surfaces in the longer side direction of the housing vessel 35 and on one of the two inner surfaces in the shorter side direction of the housing vessel 35. As shown in FIG. 5, the battery module 3 is positioned within the space surrounded by the three protective sheets 33 and the printed wiring board 24. Further, a lid 36 is mounted to the upper surface of the housing vessel 35.

Incidentally, it is possible to use a thermally shrinkable tape in place of the adhesive tape 23 for fixing the battery module 3. In this case, the protective sheets are arranged on both side surfaces of the battery module and, after the thermally shrinkable tube is wound to surround the protective sheets, the thermally shrinkable tube is thermally shrunk so as to bind the battery module.

Incidentally, the unit cells 21 are connected in series in the embodiment shown in FIGS. 5 and 6. However, it is also possible for the unit cells 21 to be connected in parallel so as to increase the battery capacity. Of course, it is possible to connect the battery packs in series or in parallel.

The construction of the flattened type nonaqueous electrolyte secondary battery used in the battery pack is not limited to the construction shown in FIG. 2. For example, it is possible for the flattened nonaqueous electrolyte secondary battery to be constructed as shown in FIGS. 7 and 8. FIG. 7 is an oblique view, partly broken away, schematically showing the construction of another example of the flattened type nonaqueous electrolyte secondary battery used in the battery pack shown in FIG. 5, and FIG. 8 is a cross sectional view showing in a magnified fashion the construction of part A shown in FIG. 7.

As shown in FIG. 7, a stacked type electrode group 18 is housed in a case 17 formed of a laminate film. As shown in FIG. 8, the stacked type electrode group 18 is constructed such that a positive electrode 12 and a negative electrode 13 are alternately stacked one upon the other with a separator 14 interposed between the positive electrode 12 and the negative electrode 13. A plurality of positive electrodes 12 are included in the laminate film case 17. Each of the positive electrodes 12 comprises a positive electrode current collector 12a, and positive electrode layers 12b containing a positive electrode active material and formed on both surfaces of the positive electrode current collector 12a. Likewise, a plurality of negative electrodes 13 are included in the laminate film case 17. Each of the negative electrodes 13 comprises a negative electrode current collector 13a, and negative electrode layers 13b containing a negative electrode active material and formed on both surfaces of the negative electrode current collector 13a. One side of the negative electrode current collector 13a included in each of the negative electrodes 13 protrudes from the positive electrode 12. The negative electrode current collector 13a protruding from the positive electrode 12 is electrically connected to the band-like negative electrode terminal 16. The tip portion of the band-like negative electrode terminal 16 is withdrawn to the outside of the case 17. Also, that side of the positive electrode current collector 12a of the positive electrode 12 which is positioned on the side opposite to the protruding side of the negative electrode current collector 13a, though the protruding portion of the positive electrode current collector 12a is not shown in the drawings. The positive electrode current collector 12a protruding from the positive electrode 12 is electrically connected to the band-like positive electrode terminal 15. Also, the tip portion of the band-like positive electrode terminal 15 is positioned on the side opposite to the side of the negative electrode terminal 16 and is withdrawn to the outside from the side of the case 17.

Some Examples of the present invention will now be described in detail with reference to the drawings referred to previously. Needless to say, the technical scope of the present invention is not limited to the following Examples as far as the subject matter of the present invention is concerned.

Example 1

The manufacturing method of the negative electrode will now be described first. Specifically, a slurry was prepared first by dispersing lithium titanate ($Li_4Ti_5O_{12}$) used as a negative electrode active material and having an average particle diameter of 0.3 µm, a carbon powder used as an electrically conductive agent and having an average particle diameter of 0.4 µm, and polyvinylidene fluoride (PVdF) used as a binder, which were mixed in a weight ratio of 90:7:3, in a n-methylpyrrolidone (NMP) solvent, followed by coating an aluminum alloy foil (purity of 99.4%) having a thickness of 12 µm and an average crystal grain size of 50 µm with the resultant slurry and subsequently drying and pressing the aluminum alloy foil coated with the slurry so as to manufacture a negative electrode having an electrode density of 2.4 g/cm$^3$. Incidentally, the negative electrode current collector was manufactured by annealing at 200° C. an aluminum alloy foil (purity of 99.4%) having a thickness of 12 µm and an average crystal grain size of 90 µm, followed by cooling the annealed aluminum alloy foil to room temperature.

On the other hand, a positive electrode was manufactured as follows. Specifically, a slurry was prepared first by dispersing lithium-cobalt oxide ($LiCoO_2$) used as a positive electrode active material, a graphite powder used as an electrically conductive agent, and polyvinylidene fluoride (PVdF) used as a binder, which were mixed in a weight ratio of 87:8:5, in a n-methylpyrrolidone (NMP) solvent, followed by coating an aluminum foil (purity of 99.99%) having a thickness of 15 µm and an average crystal grain size of 12 µm with the resultant slurry and subsequently drying and pressing the aluminum foil coated with the slurry so as to manufacture a positive electrode having an electrode density of 3.5 g/cm$^3$. Incidentally, the positive electrode current collector was manufactured by annealing at 140° C. an aluminum foil (purity of 99.99%) having a thickness of 15 µm and an average crystal grain size of 90 µm, followed by cooling the annealed aluminum foil to room temperature.

A laminate film including an aluminum layer and having a thickness of 0.1 mm was used for forming the case of the nonaqueous electrolyte secondary battery. The aluminum layer included in the laminate film had a thickness of about 0.03 mm and an average crystal grain size of about 100 µm. Also, polypropylene was used as the resin for reinforcing the aluminum layer. The case was prepared by sealing the periphery of the superposed laminate films by means of the heat sealing.

In the next step, a band-like positive electrode terminal was electrically connected to the positive electrode, and a band-like negative electrode terminal was electrically connected to the negative electrode. Then, a separator formed of a porous polyethylene film having a thickness of 12 µm covered the positive electrode. Further, the negative electrode was stacked on the positive electrode covered with the separator, and the resultant structure was spirally wound so as to manufacture an electrode group. The electrode group thus manufactured was pressed so as to permit the electrode group to be shaped flat, and the flattened electrode group was inserted into a case.

Then, a liquid nonaqueous electrolyte was prepared by dissolving a lithium salt of $LiBF_4$ in an organic solvent prepared by mixing EC and GBL in a mixing ratio (EC:GBL) by volume of 1:2. The lithium salt was dissolved in the mixed solvent in an amount of 1.5 mol/L. The liquid nonaqueous electrolyte thus prepared is poured into the case, thereby obtaining a flattened type nonaqueous electrolyte secondary battery having a thickness of 6.5 mm, a width of 70 mm and a height of 100 mm and constructed as shown in FIG. 2. The flattened type nonaqueous electrolyte secondary battery thus manufactured was found to have a battery weight of 90 g and a nominal capacity of 3,000 mAh.

Three flattened type nonaqueous electrolyte secondary batteries were connected in series on a plastic plate so as to obtain a single module, followed by connecting in series 28 modules so as to obtain a battery module of a regenerative charging system. Further, a regenerative charging system as shown in FIG. 1 referred to previously was manufactured by using the battery module thus obtained, a battery control unit (BMU) and a booster unit.

The regenerative charging system was put under an environment of 55° C., and the battery module was charged with a regenerative current (input) supplied from a DC motor while monitoring the temperature of the battery module with a temperature sensor. Since the battery module temperature was found to be 60° C., the charging capacity, which permitted the maximum value of the state of charge (SOC) to be 85% of the fully charged state (100%) which corresponds to the rated capacity, was automatically calculated by the BMU. The charging was continued while controlling the voltage so as to reach an aimed charging capacity. The maximum end-of-charge voltage $V_1$ was found to be 2.65 V (closed circuit), which corresponds to 0.946×$V_0$. Incidentally, the maximum end-of-charge voltage $V_0$ among the end-of-charge voltage of the unit cells constituting a single module under the state of being fully charged at 25° C. was found to be 2.8 (V). An input-output cycle test was conducted under this temperature environment.

Example 2

A regenerative charging system was manufactured as in Example 1, except that the regenerative charging system was put under an environment of 75° C., and the battery module was charged with a regenerative current (input) supplied from a DC motor while monitoring the temperature of the battery module with a temperature sensor. Since the battery module temperature was found to be 80° C., the charging capacity, which permitted the maximum value of the SOC to be 65%, was automatically calculated by the BMU. The charging was continued while controlling the voltage so as to reach an aimed charging capacity. The maximum end-of-charge voltage $V_1$ was found to be 2.45 V (closed circuit). Further, the input-output cycle test was conducted under this temperature environment.

Example 3

A regenerative charging system was manufactured as in Example 1, except that the regenerative charging system was put under an environment of 40° C., and the battery module was charged with a regenerative current (input) supplied from a DC motor while monitoring the temperature of the battery module with a temperature sensor. Since the battery module temperature was found to be 45° C., the charging capacity, which permitted the maximum value of the SOC to be 90%, was automatically calculated by the BMU. The charging was continued while controlling the voltage so as to reach an aimed charging capacity. The maximum end-of-charge voltage $V_1$ was found to be 2.68 V (closed circuit). Further, the input-output cycle test was conducted under this temperature environment.

Example 4

A regenerative charging system was manufactured as in Example 1, except that the regenerative charging system was put under an environment of 65° C., and the battery module was charged with a regenerative current (input) supplied from a DC motor while monitoring the temperature of the battery module with a temperature sensor. Since the battery module temperature was found to be 70° C., the charging capacity, which permitted the maximum value of the SOC to be 70%, was automatically calculated by the BMU. The charging was continued while controlling the voltage so as to reach an aimed charging capacity. The maximum end-of-charge voltage $V_1$ was found to be 2.50 V (closed circuit). Further, the input-output cycle test was conducted under this temperature environment.

Example 5

A regenerative charging system was manufactured as in Example 1, except that the regenerative charging system was put under an environment of 50° C., and the battery module was charged with a regenerative current (input) supplied from a DC motor while monitoring the temperature of the battery module with a temperature sensor. Since the battery module temperature was found to be 55° C., the charging capacity, which permitted the maximum value of the SOC to be 88%, was automatically calculated by the BMU. The charging was continued while controlling the voltage so as to reach an aimed charging capacity. The maximum end-of-charge voltage $V_1$ was found to be 2.66 V (closed circuit). Further, the input-output cycle test was conducted under this temperature environment.

Example 6

A regenerative charging system was manufactured as in Example 1, except that the regenerative charging system was put under an environment of 45° C., and the battery module was charged with a regenerative current (input) supplied from a DC motor while monitoring the temperature of the battery module with a temperature sensor. Since the battery module temperature was found to be 65° C., the charging capacity, which permitted the maximum value of the SOC to be 85%, was automatically calculated by the BMU. The charging was continued while controlling the voltage so as to reach an aimed charging capacity. The maximum end-of-charge voltage $V_1$ was found to be 2.38 V (closed circuit). Further, the input-output cycle test was conducted under this temperature environment.

Comparative Example 1

A regenerative charging system was manufactured as in Example 1, except that the regenerative charging system was put under an environment of 55° C., and the battery module was charged with a regenerative current (input) supplied from a motor while monitoring the temperature of the battery module with a temperature sensor. Since the battery module temperature was found to be 60° C., the charging capacity, which permitted the maximum value of the SOC to be 105%, was automatically calculated by the BMU. The charging was continued while controlling the voltage so as to reach an aimed charging capacity. The maximum end-of-charge voltage $V_1$ was found to be 2.80 V (closed circuit). Further, the input-output cycle test was conducted under this temperature environment.

Comparative Example 2

A regenerative charging system was manufactured as in Example 1, except that the regenerative charging system was put under an environment of 75° C., and the battery module was charged with a regenerative current (input) supplied from a motor while monitoring the temperature of the battery module with a temperature sensor. Since the battery module temperature was found to be 80° C., the charging capacity, which permitted the maximum value of the SOC to be 110%, was automatically calculated by the BMU. The charging was continued while controlling the voltage so as to reach an aimed charging capacity. The maximum end-of-charge voltage $V_1$ was found to be 2.80 V (closed circuit). Further, the input-output cycle test was conducted under this temperature environment.

Comparative Example 3

A regenerative charging system was manufactured as in Example 1, except that the regenerative charging system was put under an environment of 40° C., and the battery module was charged with a regenerative current (input) supplied from a motor while monitoring the temperature of the battery module with a temperature sensor. Since the battery module temperature was found to be 45° C., the charging capacity, which permitted the maximum value of the SOC to be 102%, was automatically calculated by the BMU. The charging was continued while controlling the voltage so as to reach an aimed charging capacity. The maximum end-of-charge voltage $V_1$ was found to be 2.80 V (closed circuit). Further, the input-output cycle test was conducted under this temperature environment.

Comparative Example 4

A regenerative charging system was manufactured as in Example 1, except that a mesophase based carbon fiber was used as the negative electrode active material.

Comparative Example 5

A regenerative charging system was manufactured as in Comparative Example 1, except that a mesophase based carbon fiber was used as the negative electrode active material.

An input-output cycle test was applied to the regenerative charging system obtained in each of Examples 1 to 6 and Comparative Examples 1 to 5. After discharged at constant-current rate of 5 C to reach 20% of SOC, the regenerative charging system was charged (input) with a regenerative power supplied from a DC motor under the maximum current rate of 10 C until the maximum end-of-charge voltage $V_1$ was reached, thereby obtaining a prescribed SOC value. The input-output operation was repeated so as to measure the output density (10 seconds) under the charged state of SOC 50% after 1,000 cycles and to measure the swelling rate of the unit cell (based on the thickness of the unit cell before the cycle test). Tale 1 shows the experimental data. Incidentally, Table 1 also shows the relationship between the maximum end-of-charge voltage $V_1$ and the maximum end-of-charge voltage $V_0$ at 25° C. under the state of being charged full.

TABLE 1

| | Battery module temperature (° C.) | Maximum end-of-charge voltage $V_1$ (V) | Maximum end-of-charge voltage ratio | Maximum SOC (%) | Rate of increase in the unit cell thickness after 1000 cycles (%) | Output density after 1000 cycles (W/kg) |
|---|---|---|---|---|---|---|
| Example 1 | 60 | 2.65 | $0.946 V_0$ | 85 | 1.3 | 1950 |
| Example 2 | 80 | 2.45 | $0.875 V_0$ | 65 | 2.5 | 1850 |
| Example 3 | 45 | 2.68 | $0.957 V_0$ | 90 | 1.0 | 2000 |
| Example 4 | 70 | 2.50 | $0.893 V_0$ | 70 | 2.0 | 1900 |
| Example 5 | 55 | 2.66 | $0.950 V_0$ | 88 | 1.2 | 2000 |
| Example 6 | 65 | 2.38 | $0.850 V_0$ | 85 | 1.0 | 1500 |
| Comparative Example 1 | 60 | 2.80 | $1.00 V_0$ | 105 | 20 | 300 |
| Comparative Example 2 | 80 | 2.80 | $1.00 V_0$ | 110 | 35 | 100 |
| Comparative Example 3 | 45 | 2.80 | $1.00 V_0$ | 102 | 15 | 500 |
| Comparative Example 4 | 60 | 3.97 | $0.946 V_0$ | 80 | 20 | 600 |
| Comparative Example 5 | 60 | 4.20 | $1.00 V_0$ | 105 | 50 | 400 |

As apparent from the experimental data given in Table 1, the regenerative charging system for each of Examples 1 to 6 was found to be capable of suppressing the swelling of the unit cell while maintaining a very high output density under the battery module temperature no lower than 45° C., compared with the regenerative charging system for Comparative Examples 1 to 3. In particular, the regenerative charging system for each of Examples 1, 3 and 5, which satisfied the condition of $0.9 \times V_0 \leqq V_1 \leqq 0.96 \times V_0$, was found to be excellent in both the output density and the rate of increase in the thickness of the unit cell after 1,000 input-output cycles.

A carbonaceous material was used as the negative electrode active material in the regenerative charging system for each of Comparative Examples 4 and 5. As a result, a large amount of gas was generated in spite of the value of the maximum end-of-charge voltage $V_1$. Such being the situation, the rate of increase in the thickness of the unit cell was enlarged after 1,000 input-output cycles so as to lower the output density.

Example 7

A negative electrode was manufactured as follows. Specifically, a slurry was prepared first by dispersing the Spinel type lithium titanate ($Li_4Ti_5O_{12}$) used as a negative electrode active material and having an average particle diameter of 0.9 μm, a carbon powder used as an electric conductive agent and having an average particle diameter of 0.4 μm, and polyvinylidene fluoride (PVdF) used as a binder, which were mixed at a mixing ratio of 90:7:3, in an n-methylpyrrolidone (NMP) solvent, followed by coating an aluminum alloy foil which contains Si and Fe with an amount of 0.5% and has a purity of 99.4%, a thickness of 12 μm and an average crystal grain size of 50 μm, and subsequently drying and pressing the aluminum alloy foil coated with the slurry, thereby obtaining a negative electrode having an electrode density of 2.4 g/cm³.

A negative electrode layer was formed on each surface of the negative electrode current collector. The total thickness of the negative electrode layers formed on both surfaces of the negative electrode current collector was found to be 60 μm. Also, the negative electrode layer formed on one surface of the negative electrode current collector was found to have a thickness of 30 μm.

On the other hand, a positive electrode was manufactured as follows. Specifically, a lithium-nickel-cobalt-manganese composite oxide ($LiNi_{1/3}CO_{1/3}Mn_{1/3}O_2$) having an average particle diameter of 1 μm was prepared as the positive electrode active material. Then, a slurry was prepared by dispersing in an n-methylpyrrolidone the positive electrode active material together with a graphite powder in an amount of 8% by weight of the entire positive electrode, which was used as an electric conductive agent, and PVdF in an amount of 5% by weight of the entire positive electrode, which was used as a binder, followed by coating the both surfaces of an aluminum alloy foil which contains Si and Fe with an amount of 0.5% and has a purity of 99.4%, a thickness of 15 μm and an average crystal grain size of 12 μm with the slurry noted above, and subsequently drying and pressing the aluminum alloy foil coated with the slurry, thereby obtaining a positive electrode having an electrode density of 3.5 g/cm³.

A positive electrode layer was formed on each surface of the positive electrode current collector. The total thickness of the positive electrode layers formed on both surfaces of the positive electrode current collector was found to be 60 μm. Also, the positive electrode layer formed on one surface of the positive electrode current collector was found to have a thickness of 30 μm.

A laminate film including an aluminum foil, which is equal to that used in Example 1, was used for forming the case of the nonaqueous electrolyte secondary battery.

In the next step, a band-like positive electrode terminal was electrically connected to the positive electrode, and a band-like negative electrode terminal was electrically connected to the negative electrode. Then, a separator formed of a porous polyethylene film having a thickness of 12 μm covered the positive electrode. Further, the negative electrode was stacked on the positive electrode covered with the separator, and the resultant structure was spirally wound so as to manufacture an electrode group. The electrode group thus manufactured was pressed so as to permit the electrode group to be shaped flat, and the flattened electrode group was inserted into the case.

Then, a liquid nonaqueous electrolyte was prepared by dissolving a lithium salt of $LiBF_4$ in an organic solvent prepared by mixing EC and GBL in a mixing ratio (EC:GBL) by volume of 1:2. The lithium salt was dissolved in the mixed solvent in an amount of 1.5 mol/L. The liquid nonaqueous electrolyte thus prepared was poured into the case, thereby obtaining a flattened type nonaqueous electrolyte secondary battery having a thickness of 4 mm, a width of 100 mm and a height of 170 mm and constructed as shown in FIG. 2. The flattened type nonaqueous electrolyte secondary battery thus manufactured was found to have a rated capacity of 6 Ah.

Ten flattened type nonaqueous electrolyte secondary batteries thus obtained were connected in series and, then, made integral by using an adhesive tape so as to obtain a battery module. A battery pack constructed as shown in FIGS. 5 and 6 referred to previously was manufactured by using the battery module thus obtained so as to obtain a storage battery system. Incidentally, the temperature measurement using a thermistor was applied to the secondary batteries constituting the both outermost layers of the battery module and to the secondary battery constituting the intermediate layer of the battery module.

The storage battery system was put under an environment of 45° C., and the battery was rapidly charged under the current rate of 20 C while monitoring the temperature of the battery module with a thermistor. Since the temperature of the battery module was found to be 60° C., the charging capacity, which permitted the maximum value of the SOC to be 80%, was automatically calculated by the protective circuit 26. The charging was continued while controlling the voltage so as to reach an aimed charging capacity. The maximum end-of-charge voltage $V_1$ was found to be 2.55 V (closed circuit), which corresponds to $0.85 \times V_0$. Incidentally, the maximum end-of-charge voltage $V_0$ among the end-of-charge voltage of the unit cells under the state of being fully charged at 25° C. was found to be 3.0 (V). An input-output cycle test was conducted under this temperature environment. The conditions for conducting the input-output cycle test were as follows.

Specifically, the battery module was discharged to reach the SOC of 20% under the constant-current rate of 5 C, followed by applying an input operation under the current rate of 10 C until a prescribed SOC value and a prescribed maximum end-of-charge voltage $V_1$ were reached. The input-output operation was repeated so as to measure the output density (10 seconds) under the charged state of SOC 50% after 1,000 cycles of the input-output operation and to measure the swelling rate of the unit cell (based on the thickness of the unit cell before the cycle test).

The swelling rate of the unit cell after 1,000 cycles of the input-output operation was found to be 1.0%, and the output density after 1,000 cycles of the input-output operation was found to be 1,500 W/kg (10 seconds).

As described above, the embodiments of the present invention provides a storage battery system and an automobile, which permit suppressing the swelling of the battery during the rapid charging under a high temperature environment such as a regenerative charging under a high temperature environment.

The input-output rates are not limited to those employed in the Examples described above and can be set at an optional value within a range of 2 C to 120 C. Also, the input-output can be performed consecutively or in the form of a pulse. The pulse time can be set to fall within a range of 0.1 to 30 seconds.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method, comprising:
charging a battery module comprising at least two nonaqueous electrolyte secondary batteries wherein the charging is carried out at a temperature of the battery module of from 45 to 90° C. and until a maximum end-of-charge voltage $V_1$ (V) for the at least two nonaqueous electrolyte secondary batteries is a value represented by formula (1):

$$0.85 \times V_0 \leq V_1 \leq 0.96 \times V_0 \quad (1)$$

where $V_0$ denotes a maximum end-of-charge voltage (V) of the nonaqueous electrolyte secondary batteries when the battery module is charged fully at 25° C., wherein
each of the nonaqueous electrolyte secondary batteries comprises a negative electrode, a positive electrode and a nonaqueous electrolyte, the negative electrode comprising a negative electrode layer and a current collector having the negative electrode layer present thereon, and the negative electrode layer comprises lithium-titanium composite oxide particles,
wherein the current collector is an aluminum foil or an aluminum alloy foil and the crystal grain size of the aluminum or aluminum alloy is no larger than 50 μm.

2. The method according to claim 1, wherein the lithium-titanium composite oxide particles have an average particle diameter of no larger than 1 μm.

3. The method according to claim 1, wherein a charging rate during the charging is from 2 C to 120 C, where the charging rate 1 C is a current value required for discharging the nonaqueous electrolyte secondary battery in one hour.

4. The method according to claim 1, wherein the charging is carried out at a temperature of the battery module of from 45 to 60° C.

5. The method according to claim 1, wherein the lithium-titanium composite oxide particles comprise lithium titanate particles having a spinel structure.

6. The method according to claim 1, wherein the nonaqueous electrolyte comprises at least one solvent selected from the group consisting of γ-butyrolactone, propylene carbonate and ethylene carbonate.

7. The method according to claim 1, wherein the maximum end-of-charge voltage $V_1$ (V) is a value represented by formula (2):

$$0.9 \times V_0 \leq V_1 \leq 0.96 \times V_0 \quad (2)$$

where $V_0$ denotes the maximum end-of-charge voltage (V) of the nonaqueous electrolyte secondary batteries when the battery module is charged fully at 25° C.

8. The method according to claim 1, wherein the positive electrode comprises a lithium-nickel-cobalt-manganese composite oxide represented by $Li_aNi_bCo_cMn_dO_2$, where the molar ratio of a, b, c and d are:

$$0 \leq a \leq 1.1,$$

$$b+c+d=1.$$

9. The method according to claim 1, wherein the lithium-titanium composite oxide particles have an average particle diameter of from 0.001 to 0.3 μm.

10. The method according to claim 1, wherein said positive electrode comprises a current collector, a positive electrode layer present on the current collector, said positive electrode layer comprising a positive electrode active material, an electrically conductive agent and a binder;
said positive electrode active material comprising a lithium-nickel-cobalt-manganese composite oxide represented by $Li_aNi_bCo_cMn_dO_2$, where the molar ratio of a, b, c and d are:

$0 \leq a \leq 1.1$, $b+c+d=1$;

said electrically conductive agent comprising at least one member selected from the group consisting of an acetylene black, a carbon black and graphite; and
said binder comprises at least one member selected from the group consisting of polytetrafluoroethylene, polyvinylidene fluoride, and a fluorine rubber.

11. The method according to claim 1, wherein said positive electrode comprises a current collector, a positive electrode layer present on the current collector, said positive electrode layer comprising 80 to 95% by weight of a positive electrode active material, 3 to 18% by weight of an electrically conductive agent and 2 to 7% by weight of a binder;
said positive electrode active material comprising a lithium-nickel-cobalt-manganese composite oxide represented by $Li_aNi_bCo_cMn_dO_2$, where the molar ratio of a, b, c and d are:

$0 \leq a \leq 1.1$, $b+c+d=1$;

said electrically conductive agent comprising at least one member selected from the group consisting of an acetylene black, a carbon black and graphite; and
said binder comprises at least one member selected from the group consisting of polytetrafluoroethylene, polyvinylidene fluoride, and a fluorine rubber.

12. The method according to claim 1, wherein said non-aqueous electrolyte comprises at least one member selected from the group consisting of $LiClO_4$, $LiPF_6$, $LiBF_4$, $LiAsF_6$, $LiCF_3SO_3$, $LiN(CF_3SO_2)_2$, $LiN(C_2F_5SO_2)_2$, $Li(CF_3SO_2)_3C$, and $LiB[(OCO)_2]_2$.

13. The method according to claim 1, wherein said non-aqueous electrolyte comprises
at least one solvent selected from the group consisting of propylene carbonate, ethylene carbonate, diethyl carbonate, dimethyl carbonate, methyl ethyl carbonate, dimethoxy ethane, diethoxy ethane, tetrahydrofuran, dioxofuran, γ-butyrolactone, acetonitrile (AN), and sulfolane (SL); and
at least one electrolyte selected from the group consisting of $LiClO_4$, $LiPF_6$, $LiBF_4$, $LiAsF_6$, $LiCF_3SO_3$, $LiN(CF_3SO_2)_2$, $LiN(C_2F_5SO_2)_2$, $Li(CF_3SO_2)_3C$, and $LiB[(OCO)_2]_2$, wherein
said at least one electrolyte is present in said at least one solvent in an amount of 0.5 to 2 mol/L.

14. The method according to claim 1, wherein said lithium-titanium composite oxide particles of said the negative electrode layer comprise at least one of:
particles of a spinel lithium-titanium composite oxide represented by $Li_{4+x}Ti_5O_{12}$, where $-1 \leq x \leq 3$; and
particles of a ramsdellite lithium titanate represented by $Li_{2+x'}Ti_3O_7$, where $-1 \leq x' \leq 3$.

15. The method according to claim 1, wherein said lithium-titanium composite oxide particles of said the negative electrode layer comprise particles of a spinel lithium-titanium composite oxide represented by $Li_{4+x}Ti_5O_{12}$, where $-1 \leq x \leq 3$.

16. The method according to claim 1, wherein said lithium-titanium composite oxide particles of said the negative electrode layer comprise particles of a ramsdellite lithium titanate represented by $Li_{2+x'}Ti_3O_7$, where $-1 \leq x' \leq 3$.

* * * * *